(12) United States Patent
Brisky et al.

(10) Patent No.: US 8,086,834 B2
(45) Date of Patent: Dec. 27, 2011

(54) SYSTEM AND METHOD FOR POPULATING A DEDICATED SYSTEM SERVICE REPOSITORY FOR AN INFORMATION HANDLING SYSTEM

(75) Inventors: Philip J. Brisky, Manchaca, TX (US);
Mahesh Kalambi, Austin, TX (US);
Fritz A. Kocher, Pflugerville, TX (US);
Terry Wayne Liles, Round Rock, TX (US); Chi Nguyen, Austin, TX (US);
Weijia Zhang, Round Rock, TX (US);
Abhay Arjun Salunke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 455 days.

(21) Appl. No.: 12/425,292

(22) Filed: Apr. 16, 2009

(65) Prior Publication Data
US 2010/0268925 A1 Oct. 21, 2010

(51) Int. Cl.
*G06F 9/24* (2006.01)
*G06F 15/177* (2006.01)
(52) U.S. Cl. .............. 713/1; 717/104; 717/121
(58) Field of Classification Search ...... 713/1; 717/104, 717/121
See application file for complete search history.

(56) References Cited

U.S. PATENT DOCUMENTS

| | | | |
|---|---|---|---|
| 5,995,757 A | 11/1999 | Amberg et al. | 395/712 |
| 6,247,126 B1 | 6/2001 | Beelitz et al. | 713/1 |
| 6,279,155 B1 | 8/2001 | Amberg et al. | 717/11 |
| 6,279,156 B1 | 8/2001 | Amberg et al. | 717/11 |
| 6,285,967 B1 | 9/2001 | Rajan et al. | 702/188 |
| 6,327,706 B1 | 12/2001 | Amberg et al. | 717/11 |
| 6,347,371 B1 | 2/2002 | Beelitz et al. | 713/2 |
| 7,565,650 B2 * | 7/2009 | Bhogal | 717/178 |
| 7,793,087 B2 * | 9/2010 | Zenz et al. | 713/1 |
| 7,827,394 B2 * | 11/2010 | Brown et al. | 713/1 |
| 2005/0216912 A1 * | 9/2005 | Cox et al. | 717/178 |
| 2006/0075400 A1 * | 4/2006 | Jarvis et al. | 717/174 |

* cited by examiner

*Primary Examiner* — Thuan Du
(74) *Attorney, Agent, or Firm* — Baker Botts L.L.P.

(57) ABSTRACT

An information handling system includes a processor, a memory device coupled to the processor, and a dedicated system service repository (DSSR) coupled to the processor. The DSSR is configured to store a base image that includes a plurality of partitions and a first system configuration image, wherein the first system configuration image is stored in a first partition of the plurality of partitions, wherein the first system configuration image is configured to provide in-band and/or out-of-band managed access to the DSSR when executed; and by accessing the first system configuration image, the DSSR is populated with a second system configuration image, wherein the second system configuration image is stored in a second partition of the plurality of partitions.

20 Claims, 2 Drawing Sheets

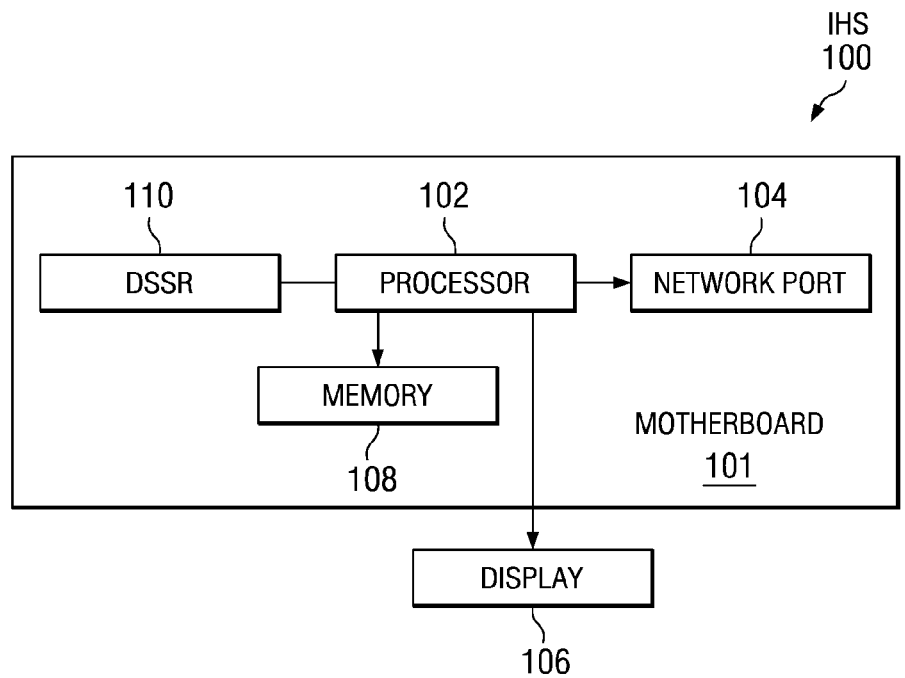
FIG. 1
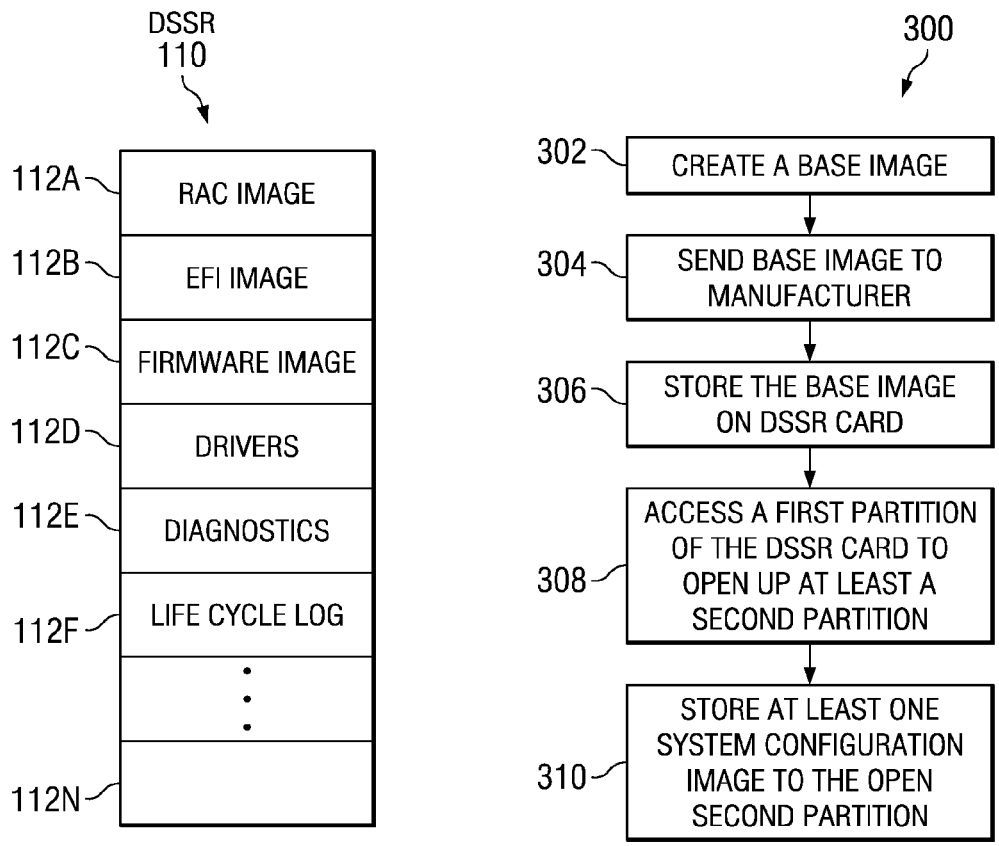
FIG. 2A
FIG. 3

SYSTEM AND METHOD FOR POPULATING A DEDICATED SYSTEM SERVICE REPOSITORY FOR AN INFORMATION HANDLING SYSTEM

TECHNICAL FIELD

The present disclosure relates to the manufacture of an information handling system, and more particularly to systems and methods for populating a dedicated system service repository for an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as, but not limited to, financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often custom configured, and in particular, a user can predefine the capabilities of hardware and software components of an information handling system. Current techniques prepare hard disk drive images in advance of the manufacture of ordered systems so that the manufacturer/provider of the information handling system may load the images prior to shipment of the systems. However, the physical copying and shipment of media containing a desired image is time consuming and susceptible to delivery and media failures. Further, the building and testing of the information handling system with the hard disk drive images may be a labor-intensive task that can increase the cost of manufacturing and decrease efficiency.

SUMMARY

In accordance with certain teachings of the present disclosure, a method for populating a dedicated system service repository (DSSR) is provided. The method includes receiving a base image from a provider of an information handling system, the base image that includes a plurality of partitions for the dedicated system service repository (DSSR) and a first system configuration image configured to provide out-of-band access to the DSSR; storing the first system configuration image to one of the plurality of partitions; executing the first system configuration image; populating the DSSR with a second system configuration image via the out-of-band access; and storing the second system configuration image in a second partition of the plurality of partitions.

According to certain teaching of the present disclosure a method includes creating a base image, the base image that includes a plurality of partitions for a dedicated system service repository (DSSR) and a first system configuration image for an information handling system used to populate the DSSR with at least a second system configuration image; wherein the first system configuration image is configured to provide out-of-band access to the DSSR when executed; providing the base image to a provider of the DSSR, wherein the DSSR is configured to store the base image; wherein via the out-of-band access, the DSSR is populated with a second system configuration image; and wherein the second system configuration image is stored in a second partition of the plurality of partitions.

According to certain teachings of the present disclosure, an information handling system includes a processor, a memory device coupled to the processor, and a dedicated system service repository (DSSR) coupled to the processor. The DSSR is configured to store a base image that includes a plurality of partitions and a first system configuration image, wherein the first system configuration image is stored in a first partition of the plurality of partitions; wherein the first system configuration image is configured to provide out-of-band access to the DSSR when executed; and by accessing the first system configuration image, the DSSR is populated with a second system configuration image, wherein the second system configuration image is stored in a second partition of the plurality of partitions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a block diagram of an example information handling system for populating a dedicated system service repository, in accordance with teachings of the present disclosure;

FIG. 2A illustrates a block diagram of an example dedicated system service repository for storing one or more system configuration images, in accordance with teachings of the present disclosure;

FIG. 3 illustrates a flow chart of an example method for populating a dedicated system service repository of an information handling system, in accordance with teachings of the present disclosure.

DETAILED DESCRIPTION

Figure 2B:
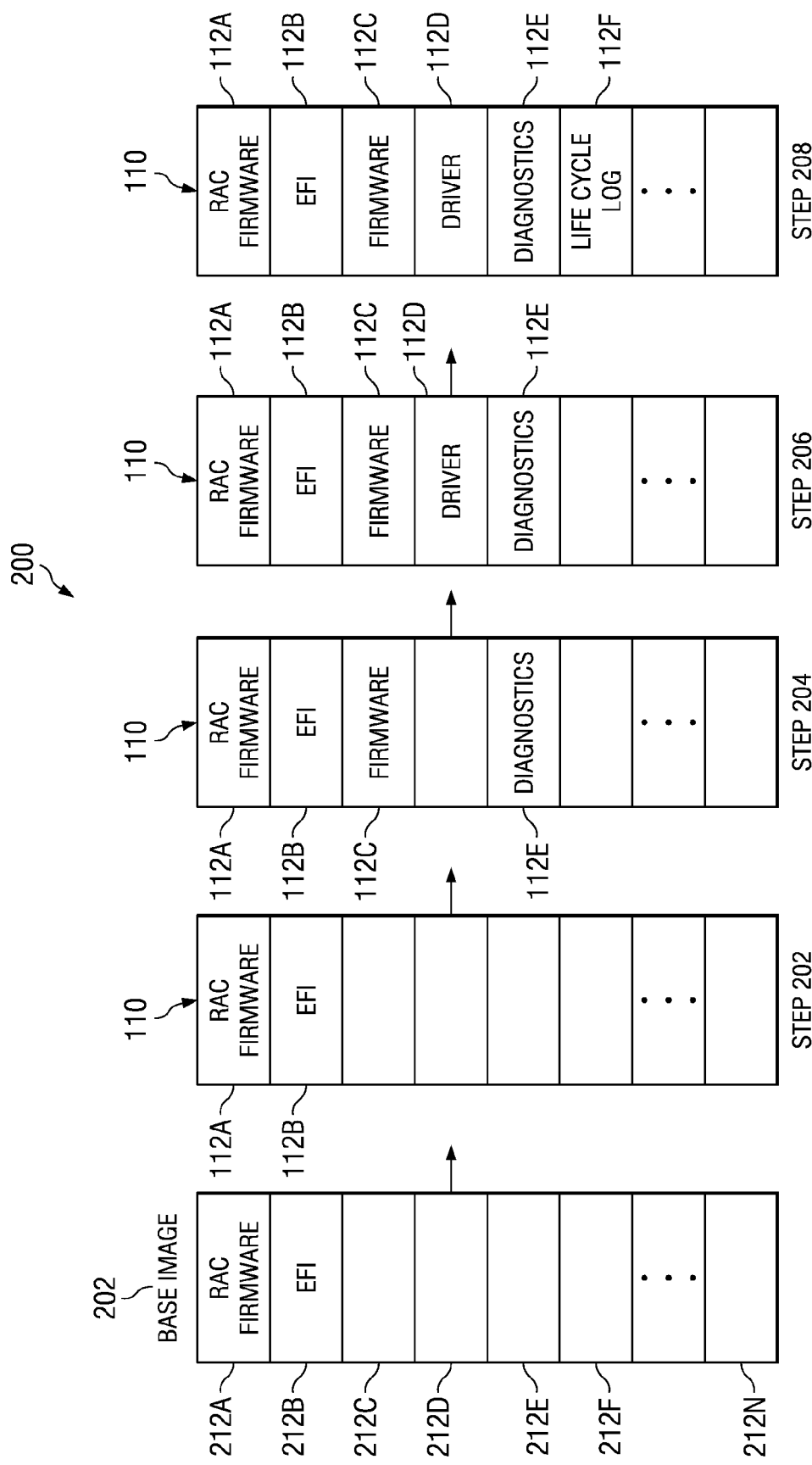
FIG. 2B illustrates a block diagram of images stored on an example dedicated system service repository at various steps during the population process, in accordance with teachings of the present disclosure.

Preferred embodiments and their advantages are best understood by reference to FIGS. 1-3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and/or a video display. The information handling system may also include one or more buses operable to transmit communications between the various hardware components.

The present disclosure provides systems and methods for managing and/or populating a repository. In some embodiments, the present disclosure provides in-band and/or out-of-band access to the repository to store system images by providing a base image that includes platform generic hooks to access the repository for further operations. For example, the base image may include one or more images that may be used to open up and access particular partitions of the repository and allow a user to write content to the accessed partitions. Details of the manageability and population of the repository are described in more detail below with respect to FIGS. 1-3.

FIG. 1 illustrates a block diagram of an example information handling system 100 for populating a dedicated system service repository (DSSR), in accordance with teachings of the present disclosure. As shown in FIG. 1, information handling system 100 may include a motherboard 101, a processor 102, a network port 104, a display 106, memory 108, and a DSSR 110.

Motherboard 101 may include a printed circuit board housing one or more electrical components of information handling system including, for example, processor 102, memory 104, network port 104, memory 108, and/or DSSR 110. Motherboard 101 may provide electrical connection (e.g., communicate data and control signals) over signal buses between various electrical components of information handling system 100.

Processor 102 may comprise any system, device, or apparatus operable to interpret and/or execute program instructions and/or process data, and may include, for example, a microprocessor, microcontroller, digital signal processor (DSP), application specific integrated circuit (ASIC), or any other digital or analog circuitry configured to interpret and/or execute program instructions and/or process data. In some embodiments, processor(s) 102 may interpret and/or execute program instructions and/or process data stored in, for example, memory 108 and/or another component of information handling system 100 and may output results, graphical user interfaces (GUIs), websites, and the like via display 106 or over network port 104.

Network port 104 may include any suitable system, apparatus, or device operable to serve as an interface between information handling system 100 and a network. Network port 104 may enable information handling system 100 to communicate over a network using any suitable transmission protocol and/or standard, including without limitation all transmission protocols and/or standards known in the art.

Display 106 may comprise any display device suitable for creating graphic images and/or alphanumeric characters recognizable to a user, and may include, for example, a liquid crystal display (LCD) or a cathode ray tube (CRT).

Memory 108 may be coupled to processor 102 and may comprise any system, device, or apparatus operable to retain program instructions or data for a period of time. Memory 108 may include random access memory (RAM), electrically erasable programmable read-only memory (EEPROM), a PCMCIA card, flash memory, or any suitable selection and/or array of volatile or non-volatile memory configured to retain data after power to information handling system 100 is turned off.

Dedicated system service repository (DSSR) 110 may include any system, device, and/or apparatus configured to receive image(s) from a user and/or a manufacturer/provider of information handling system 100. DSSR 110 may be configured to store the image(s) in a storage device internal to DSSR 110, coupled to DSSR 110 (e.g., memory 108), and/or other storage devices included on motherboard 101. DSSR 110 may comprise or may be an integral part of an access controller (e.g., Dell Remote Access Controller). In some embodiments, DSSR 110 may include a flash drive or other suitable non-volatile memory device configured to store data.

An image, as used herein, may be a file (e.g., a binary file, machine code, etc.) that contains data (for example, system configuration information, hardware configuration information, software configuration information, boot-up sequence (s), and/or other user and/or manufacturer's predefined configuration information for information handling system 100.) In some embodiments, DSSR 110 may receive and store one or more images for a remote access card (RAC), images of a firmware interface, images of firmware updates, images of system diagnostics, images of drivers, and/or images of a life cycle logs. Details of example images stored on DSSR 110 are described below with respect to FIGS. 2A and 2B.

FIG. 2A illustrates a block diagram of an example DSSR 110 for storing one or more images, in accordance with teachings of the present disclosure. DSSR 110 may include one or more partitions 112, each configured to store one or more images in storage device associated with DSSR 110. For example, images of a remote access card (RAC) may be stored in partition 112A, images of an extensible firmware interface (EFI) may be stored in partition 112B, images of firmware updates may be stored in partition 112C, images of drivers may be stored in partition 112D, images of information handling system 100 diagnostics may be stored in partition 112E, images of a life cycle log (LCL) may be stored in partition 112F, and/or other configuration images for information handling system 100 may be stored in any partition 112 of DSSR 110.

FIG. 2B illustrates a block diagram of images stored on an example dedicated system service repository at various steps during the population process 200, in accordance with teachings of the present disclosure. In operation, a base image 202 may be generated (e.g., by a provider of information handling system 100 based on, for example, a user configuration). Base image 202 may include a set of blank image stubs (e.g., stubs 212A through 212N.) Each stub may correlate to a partition 112 of a storage device associated with of DSSR 110 and that may subsequently be configured to store other images (e.g., system configuration information, hardware configuration information, software configuration information, boot-up sequences, and/or other user and/or manufacturer's predefined configuration information).

In certain embodiments, referring to FIG. 2B, base image 202 may also include images that may be stored in partitions 112 of DSSR 110. In some embodiments, the base image may include one or more remote access card (RAC) images that, when executed, may be accessed for in-band and/or out-of-band management by a user or manufacturer to configure information handling system 100. In other embodiments, the base image may allow out-of-band management by a use or manufacturer to configure information handling system 100. The execution of the RAC image may populate partitions 112 of DSSR 110 with other images such as, for example, images of firmware updates, images of drivers, images of diagnostics, images of a life cycle log (LCL), and/or other configuration images for information handling system 100 over a few steps. In some embodiments, the population of DSSR 110 may be done in one step (e.g., some or all partitions are loaded with various images).

The base image may also include images an operating system that may provide an access interface for a user of information handling system 100. Examples of operating system images include, without limitation, Linux operation system, extensible firmware interface, and/or other suitable operating systems that may provide access for an authorized user to information handling system 100. In some embodiments, the base image may include an extensible firmware interface (EFI) that when executed, may be used as a bootloader and may serve as an interface between an operating system operating on information handling system 100 and other firmware associated with information handling system 100.

In one embodiment, the base image may be sent from a first location (e.g., an information handling system provider location) to a second location (e.g., DSSR provider location). At step 202, the base image may be flashed and/or burned into a memory device associated with DSSR 110. The images included in the base image (e.g., remote access card images and/or the extensible firmware interface images) may be stored in one or more partitions 112 of DSSR 110. For example, referring to FIG. 2B, images of the remote access card may be stored in partition 112A and images of the extensible firmware interface may be stored in partition 112B.

At step 204, using an operating system such as a disk operating system (DOS), a real-mode kernel, and/or other suitable operating systems, a user (e.g., a provider of information handling system 100) may boot information handling system 100 and access the DSSR 110. More particularly, the user may access the RAC image stored in partition 112A in order to open (e.g., access) other partitions 112. For example, the provider of information handling system 100 may access and communicate with the image of the random access card (e.g., via intelligent platform management interface (IMPI) commands) to open up one or more other partitions 112. As another example, the provider of information handling system 100, using the RAC image stored in partition 112B, may open partitions 112C and 112E (e.g., access stub 212C which correlates to partition 112C and stub 212E which correlates with stub 112E), and subsequently copy system firmware images to partition 112C and system diagnostic image into partition 112E. After the images are loaded to the respective partitions 112, the manufacturer may close any written-to partitions 112 (e.g., partitions 112C and 112E) to reduce the chances of overwriting and/or altering the data stored in the particular partitions 112.

At step 206, the provider of information handling system 100 may boot to another operating system such as pre-installation environment (e.g., WinPE) to access one or more unwritten partitions 112. For example, during the manufacturing process, the provider of information handling system 100 may boot to an operating system (e.g., WinPE) and may communicate with DSSR 110 to open partition 112D via the operating system to copy the necessary driver image(s) needed for communication between software running on information handling system 100 and internal and/or external hardware devices coupled to information handling system 100.

At step 208, the provider of information handling system 100 may run a system configuration test to determine the inventory of information handling system 100, including for example, software, hardware, firmware, I/O devices coupled to information handling system 100, etc. The inventory may be written as life cycle log (LCL) image and may be saved to partition 112F of DSSR 110 as shown, for example, in FIG. 2B.

The provider of information handling system 100 may access other partitions 112 of DSSR 110 using various operating systems, the RAC image stored in partition 112A, and/or other suitable pre-installation environments and may be configured to open the partition, store and/or write various configuration images for information handling system 100, and/or close the partitions 112 to preserve the written images.

Although FIG. 2B discloses a particular number of steps to be taken with respect to the populating of partitions 112 of DSSR 110, the number of steps executed may be greater or lesser than those depicted in FIG. 2B. In addition, although FIG. 2B discloses a certain order of steps to be taken, the steps shown in FIG. 2B may be completed in any suitable order. For example, in some embodiments, steps 204 and 206 may be combined. In other embodiments, steps 204 and 206 may be reversed. In addition, the steps shown in FIG. 2B may be repeated, independently and/or collectively, as often as desired or required by a chosen implementation.

FIG. 3 illustrates a flow chart of an example method 300 for populating DSSR 110 of information handling system 100, in accordance with teachings of the present disclosure. At step 302, a provider and/or a user of information handling system 100 may create base image 202 (e.g., a binary file, machine code file, etc.) Base image 202 may include, for example, one or more blank image stubs or partitions 112, where each partition may store or house one or more system configuration images for information handling system 100.

Base image 202 may also include one or more system configuration images that may be stored in the one or more partitions. In embodiment, the base image may include a RAC image. The RAC image, when executed, may allow authorized user(s) of information handling system 100 remote and/or direct access to DSSR 110 (e.g., open and close various partitions of DSSR 110).

The base image may also include an extensible firmware interface that may be stored in partition 112 of DSSR 110. The extensible firmware interface may provide a bootloader and run-time interface between an operating system running on information handling system 100 and firmware associated with information handling system 100.

At step 304, the base image may be provided to a manufacturer of DSSR 110. In one embodiment, the base image may be provided by the provider of user information handling system 100 to a manufacturer or provider of DSSR 110 via a storage means (e.g., a tape disk drive, compact disk, CD-ROM, DVD, and/or any suitable selection of volatile and/or non-volatile memory and/or a physical storage resource). In other embodiments, the provider of DSSR 110 may download the base image from a server belonging to the provider of information handling system 100. In some embodiments, step 304 may be optional. The vendor or creator of the base image may also manufacture DSSR 110 and therefore, step 304 of providing the base image and receiving the base image may not be needed.

At step 306, the provider of DSSR 110 may store (e.g., flash or burn) the base image in a storage associated with DSSR 110 (e.g., memory 108). In some embodiments, the provider of DSSR 110 may store (e.g., flash or burn) the images that were included in the base image to partitions 112. For example, the RAC image may be stored in partition 112A and the extensible firmware interface may be stored in partition 112B.

At step 308, DSSR 110 may be sent to the provider of information handling system 100. The provider of information handling system 100 may access one or more partitions 112 of DSSR 110 to store other system configuration images for information handling system 100. In some embodiments, the provider of information handling system 100 may boot information handling system 100 using an operating system (e.g., a disk operating system (DOS), a real-mode kernel, pre-installation environment (e.g., WinPE), or other suitable operating systems). In addition, the provider of information handling system 110 may access the RAC image stored in partition 112A in order to open other partitions 112 (e.g., change from read-only to read-write only and/or write-only).

At step 310, using one or more operating systems, the provider of information handling system 100 may store (e.g., write/burn/flash) one or more images to partitions 112 opened at step 308. For example, using a disk operating system (DOS), a real mode kernel, or other suitable operating systems, the provider of information handling system 100 may write firmware image(s) to partition 112C opened, e.g., at step 308. The provider of information handling system 100 may also write system diagnostic image(s) into partition 112E. The writing of the firmware image(s) to partition 112C and the writing of system diagnostic image to partition 112E may occur substantially at the same time, although the writing of each of these images may occur at any time during the manufacturing process.

As another example, booting to a pre-installation environment (e.g., WinPE), the provider of information handling system 100 may write driver image(s) to partition 112D opened in step 308.

In yet another example, the provider of information handling system 100 may perform an inventory of information handling system 100 including determining various software, hardware, firmware, I/O devices coupled to information handling system 100. The inventory may be stored as an image in partition 112F opened, for example, at step 306.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order. In addition, steps 302-310 may be repeated, independently and/or collectively, as often as desired or required by a chosen implementation.

While the above examples show distinct steps to populate DSSR 110 (e.g., (1) writing the RAC image(s) and/or extensible firmware image(s), (2) writing firmware image(s) and/or system diagnostic image(s), (3) writing driver image(s), and (4) writing the life cycle log image(s)), populating DSSR 110 may be done in one step using one or more operating systems. In the same or alternative embodiments, the images may be written to partitions 112 at various stages of the manufacturing process and not necessarily in any order. For example, the writing of the driver to partition 112D may occur before or after the writing of the system diagnostic image(s) to partition 112E and/or the firmware image(s) to partition 112C.

The present disclosure provides, among other advantages, managed access for the population of a DSSR while protecting images that have written into partitions of the DSSR. The managed access may provide in-band access to an authorize user (e.g., a manufacturer of a DSSR and/or of the information handling system, a user of the information handling system, etc.). In other embodiments, the managed access may provide out-of-band access to authorized user(s).

Although the present disclosure has been described in detail, it should be understood that various changes, substitutions, and alterations may be made hereto without departing from the spirit and the scope of the invention as defined by the appended claims.

What is claimed is:

1. A method for populating a dedicated system service repository (DSSR), the method comprising:
    receiving a base image from a provider of an information handling system, the base image comprising:
        a plurality of partitions for the dedicated system service repository (DSSR); and
        a first system configuration image configured to provide out-of-band access to the DSSR;
    storing the first system configuration image to one of the plurality of partitions;
    executing the first system configuration image;
    populating the DSSR with a second system configuration image via the out-of-band access; and
    storing the second system configuration image in a second partition of the plurality of partitions.

2. The method of claim 1, wherein the first system configuration image comprises a remote access card image configured to open one or more partitions of the plurality of partitions.

3. The method of claim 1, wherein:
    the first system configuration image comprises a remote access card image configured to open one or more partitions of the plurality of partitions; and
    accessing the stored first system configuration comprises using the remote access card image to access at least one of the plurality of partitions.

4. The method of claim 1, wherein:
    the first system configuration image comprises a remote access card image configured to open one or more partitions of the plurality of partitions;
    accessing the stored first system configuration comprises using the remote access card image to access at least one of the plurality of partitions; and
    the method further comprising writing the second system configuration image to the accessed partitions.

5. The method of claim 1, wherein:
    the first system configuration image comprises a remote access card image configured to open one or more partitions of the plurality of partitions;
    accessing the stored first system configuration comprises using the remote access card image to access at least one of the plurality of partitions;
    the method further comprising writing the second system configuration image to the accessed partitions; and
    the second system configuration is selected from the group consisting of: an extensible firmware interface image, a firmware image, a driver image, a system diagnostic image, and an inventory image.

6. The method of claim 1, wherein populating the DSSR comprises populating the DSSR at various stages.

7. The method of claim 1, wherein the base image further comprises an extensible firmware interface image configured to provide an interface between an operating system and firmware running on the information handling system.

8. The method of claim 1, wherein:
    the base image further comprises an extensible firmware interface image configured to provide an interface between an operating system and firmware running on the information handling system; and the method further comprises storing the extensible firmware interface image to the second partition of the plurality of partitions.

9. A method, comprising:
creating a base image, the base image including:
  a plurality of partitions for a dedicated system service repository (DSSR);
  a first system configuration image for an information handling system used to populate the DSSR with at least a second system configuration image;
  wherein the first system configuration image is configured to provide out-of-band access to the DSSR when executed;
providing the base image to a provider of the DSSR, wherein the DSSR is configured to store the base image;
wherein via the out-of-band access, the DSSR is populated with a second system configuration image; and
wherein the second system configuration image is stored in a second partition of the plurality of partitions.

10. The method of claim 9, wherein the first system configuration image comprises a remote access card image configured to access one or more partitions of the plurality of partitions.

11. The method of claim 9, wherein the base image further comprises an extensible firmware interface image configured to provide an interface between an operating system and firmware running on the information handling system.

12. The method of claim 9, wherein:
  the base image further comprises an extensible firmware interface image configured to provide an interface between an operating system and firmware running on the information handling system, and
  the extensible firmware interface image is stored in a third partition of the plurality of partitions.

13. The method of claim 9, wherein the second system configuration is selected from the group consisting of: an extensible firmware interface image, a firmware image, a driver image, a system diagnostic image, and an inventory image.

14. An information handling system, comprising:
a processor;
a memory device coupled to the processor;
a dedicated system service repository (DSSR) coupled to the processor and configured to:
  store a base image comprising:
    a plurality of partitions;
    a first system configuration image, wherein the first system configuration image is stored in a first partition of the plurality of partitions;
    wherein the first system configuration image is configured to provide out-of-band access to the DSSR when executed; and
    by accessing the first system configuration image, the DSSR is populated with a second system configuration image, wherein the second system configuration image is stored in a second partition of the plurality of partitions.

15. The information handling system of claim 14, wherein the first system configuration image comprises a remote access card image configured to access one or more partitions of the plurality of partitions.

16. The information handling system of claim 14, wherein the wherein the second system configuration is selected from the group consisting of: an extensible firmware interface image, a firmware image, a driver image, a system diagnostic image, and an inventory image.

17. The information handling system of claim 14, wherein populating the DSSR comprises populating the DSSR at various stages.

18. The information handling system of claim 14, wherein the DSSR comprises a storage device comprising the plurality of partitions and configured to store the first system configuration image and the second configuration image.

19. The information handling system of claim 14, wherein the base image further comprises an extensible firmware interface image configured to interface between an operating system and firmware running on the information handling system.

20. The information handling system of claim 14, wherein:
  the base image further comprises an extensible firmware interface image configured to interface between an operating system and firmware running on the information handling system; and
  the extensible firmware interface is stored in a third partition of the plurality of partitions.

* * * * *